United States Patent
Karimli et al.

(10) Patent No.: US 11,272,433 B2
(45) Date of Patent: Mar. 8, 2022

(54) FREQUENCY SCANNING IN WIRELESS NETWORKS

(71) Applicant: T-Mobile USA, Inc., Bellevue, WA (US)

(72) Inventors: Yasmin Karimli, Bellevue, WA (US); Gunjan Nimbavikar, Bellevue, WA (US)

(73) Assignee: T-Mobile USA, Inc., Bellevue, WA (US)

(*) Notice: Subject to any disclaimer, the term of this patent is extended or adjusted under 35 U.S.C. 154(b) by 3 days.

(21) Appl. No.: 16/230,324

(22) Filed: Dec. 21, 2018

(65) Prior Publication Data
US 2020/0205060 A1     Jun. 25, 2020

(51) Int. Cl.
| | |
|---|---|
| *H04W 48/16* | (2009.01) |
| *H04W 48/18* | (2009.01) |
| *H04W 52/02* | (2009.01) |
| *H04W 24/10* | (2009.01) |
| *H04W 88/02* | (2009.01) |

(52) U.S. Cl.
CPC ........... *H04W 48/16* (2013.01); *H04W 24/10* (2013.01); *H04W 48/18* (2013.01); *H04W 52/0261* (2013.01); *H04W 88/02* (2013.01)

(58) Field of Classification Search
CPC ..... H04W 48/16; H04W 48/18; H04W 48/20; H04W 88/06; H04W 24/10; H04W 52/0261; H04W 88/02
See application file for complete search history.

(56) References Cited

U.S. PATENT DOCUMENTS

| | | | |
|---|---|---|---|
| 9,125,146 B1* | 9/2015 | Edara | H04W 48/16 |
| 2006/0009216 A1* | 1/2006 | Welnick | H04W 48/16 |
| | | | 455/434 |
| 2007/0091785 A1 | 4/2007 | Lindoff et al. | |
| 2009/0149176 A1 | 6/2009 | Vuong et al. | |
| 2011/0205910 A1* | 8/2011 | Soomro | H04W 80/04 |
| | | | 370/252 |
| 2016/0309399 A1* | 10/2016 | Swaminathan | H04W 48/16 |
| 2016/0381626 A1 | 12/2016 | Tsai | |
| 2018/0352491 A1* | 12/2018 | Shih | H04W 8/02 |

FOREIGN PATENT DOCUMENTS

WO    2014192796 A1    12/2014

OTHER PUBLICATIONS

International Searching Authority, International Search Report and Written Opinion, PCT Patent Application PCT/US2019/061869, dated Mar. 10, 2020, 15 pages.

* cited by examiner

*Primary Examiner* — Margaret G Mastrodonato
(74) *Attorney, Agent, or Firm* — Perkins Coie LLP

(57) ABSTRACT

The disclosed technology provides a system for scanning frequency channels that reduces the number of frequency channels scanned from among all the possible frequency channels that a wireless communication device can operate on. The wireless communication device uses historical data on last successful connection together with device data metrics from the last successful connection to determine a probability of successful connection for each of the potential frequency channels. The wireless communication device then ranks the probability associated with each frequency channel to determine a frequency scanning order that results in fewer frequencies being scanned before an appropriate channel is identified.

18 Claims, 5 Drawing Sheets

FREQUENCY SCANNING IN WIRELESS NETWORKS

BACKGROUND

One of the first—and key—steps a wireless communication device performs before it can start to communicate on a wireless communication network is frequency scanning. Frequency scanning is where a wireless communication device, such as a mobile phone, searches for signals over a range of frequencies. The wireless receiver in the mobile phone automatically tunes to select frequencies and searches for pre-determined signals, for example, synchronization signals. If the desired signal is not found on that frequency channel, the phone retunes the receiver to another band of frequencies and again searches for the desired signal, repeating this process until it finds an appropriate signal having the desired characteristics and quality.

For wideband communication channels, such frequency scanning can be time consuming and power hungry. For example, 4G LTE has over 60 designated frequency bands, with more being continuously being added. These frequency bands range from as low as 450 MHz (LTE Band 31) or 600 MHz (LTE Band 71) to as high as around 6 GHz (e.g., LTE Band 255 for Licensed Assisted Access or LTE Band 47 for V2X, both operating at 5GHz). Furthermore, each LTE band is divided into channels of various sizes and different operators can be licensed to operate on different sized channels in different bands in different geographic areas (spatial locations). Additionally, due to the desire for global roaming of LTE user equipment, many devices support multiple bands which requires a device to potentially scan over many different bands to find synchronization signals required for the device to synchronize to the network. Newer networks, such as 5G New Radio (NR) further introduces new bands including wide millimeter wave bands at and above 30 GHz.

Other wireless communication systems can also operate on different frequency bands covering a wide range of frequencies. For example, Spectrum Access Systems (SAS) compatible devices will operate in the U.S. in the 150 MHz CBRS (Citizens Broadband Radio Service) band from between 3550 MHz and 3700 MHz. This 150 MHz band may be divided into several channels, for example, 5 MHz, 10 MHz, and 20 MHz channels. Although a CBSD (CBRS Device) can obtain its frequency allocation from the SAS controller via an out-of-band channel (e.g., the Internet), the EUD (End user Device) such as a handset or CPE (customer premise equipment) communicating through the CBSD scans different frequency channels to determine the frequency that the corresponding CBSD is operating on. WLAN systems can also operate on different bands including sub-1 GHz bands (e.g., TV White space radios compatible with IEEE 802.11af or HaLow/IoT radios compatible with IEEE 802.11ah), 2.4 GHz bands (e.g., High Throughput IEEE 802.11n radios), 5 GHz bands (e.g., Very High Throughput IEEE 802.11ac radios), and mmWave radios operating on 60 GHz bands (e.g., WiGig IEEE 802.11ad radios).

DETAILED DESCRIPTION

Although some wireless standards such as LTE attempt to minimize the power consumed by a device performing frequency scans (e.g., by identifying a "coarse" primary synchronization signal before attempting to identify a "fine" secondary synchronization signal), the device nonetheless consumes lots of power doing this for the different potential frequency bands where the synchronization signals can reside. It is therefore desirable to have an intelligent device scanning algorithm to enable the device to efficiently scan the wideband channels to minimize power consumption particularly for battery-operated equipment. These and other problems are solved by the present system.

The disclosed technology provides an improved method for scanning frequency channels. The technology is adapted to operate in various types of wireless communication systems, operating in various frequency bands. As disclosed below, a wireless communication device determines an efficient order in which to scan frequency channels such that the frequency scanning order minimizes the device's power consumption by reducing the number of frequency channels scanned from among the device's available frequency channels.

Various embodiments of the invention will now be described. The following description provides specific details for a thorough understanding and an enabling description of these embodiments. One skilled in the art will understand, however, that the invention can be practiced without many of these details. Additionally, some well-known structures or functions may not be shown or described in detail, to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

Figure 1:
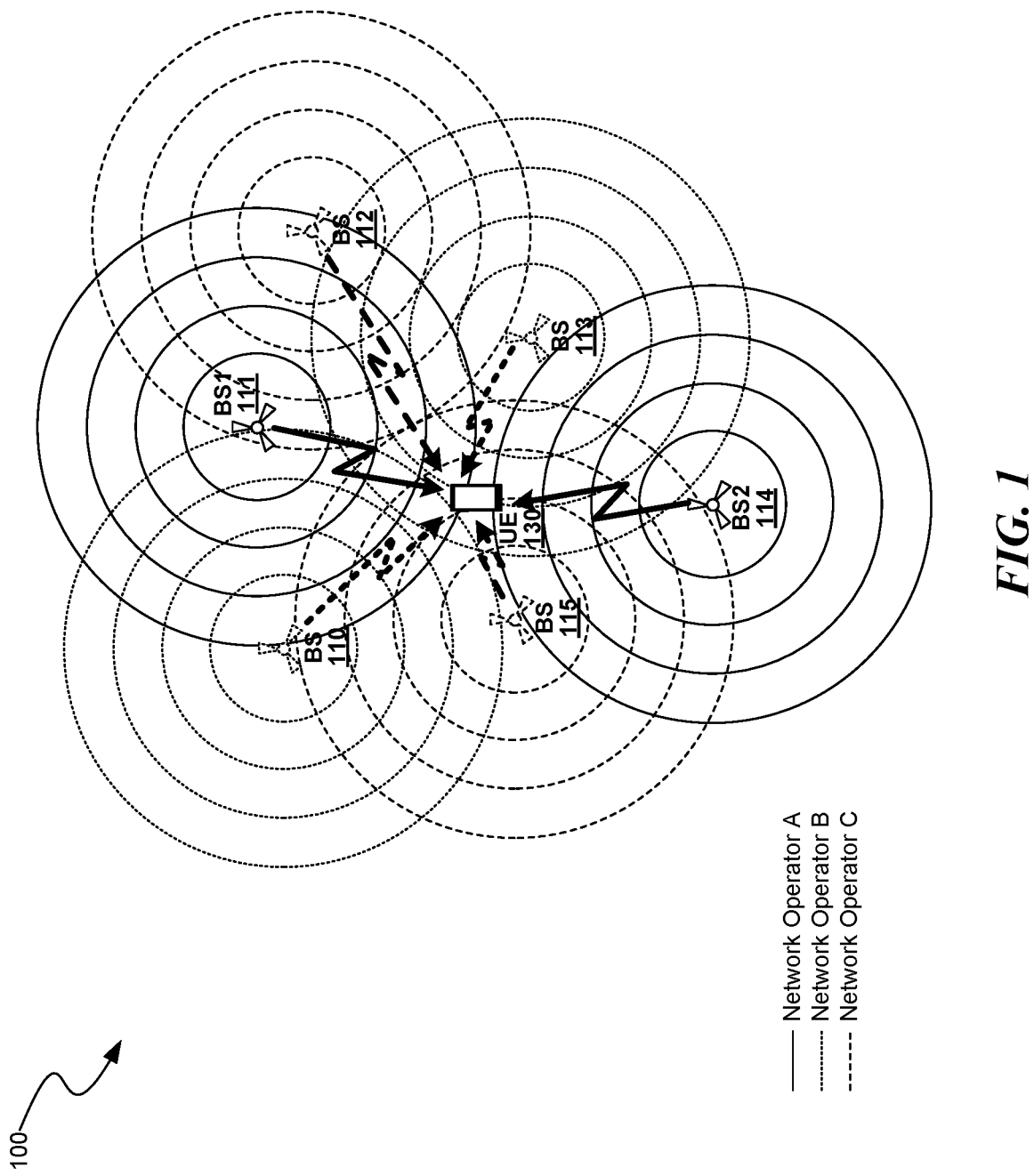
FIG. 1 shows a representative environment in which the disclosed technology to scan frequency bands can operate.

FIG. 1 shows a representative environment 100 in which the disclosed technology intelligently scans frequency channels. In the environment 100, an example arrangement of wireless base stations 110, 111, 112, 113, 114, and 115 can communicate with a wireless communication device 130. Depending on the wireless technology in which the wireless communication device 130 operates, the wireless base stations 110-115 can comprise enhanced Node Bs (eNBs) for 4G LTE networks, ng-eNB or gNB (next generation nodeB) for 5G New Radio (5G NR) networks, Access Points (AP) for IEEE 802.11 WLAN networks, CBSDs (CBRS Devices) for SAS/CBRS networks, among others. Wireless communication device 130 can be a mobile device such as a handset, mobile phone or user equipment (UE), a tablet or laptop, an embedded telemetry module in a vehicle, an autonomous or semi-autonomous vehicle, an Internet of Things (IoT) device, etc. Wireless communication device 130 can connect to a wireless network via a trusted radio access network (RAN) or an untrusted RAN. A single device 130 can can use one or both types of RANs. The RANs can use any wireless communications and data protocol or standard, such as GSM, TDMA, UMTS, EVDO, LTE, GAN, UMA, Code Division Multiple Access ("CDMA") protocols (including IS-95, IS-2000, and IS-856 protocols), Advanced LTE or LTE+, Orthogonal Frequency Division Multiple Access ("OFDM"), General Packet Radio Service ("GPRS"), Enhanced Data GSM Environment ("EDGE"), Advanced Mobile Phone System ("AMPS"), WiMAX protocols (including IEEE 802.16e-2005 and IEEE 802.16m protocols), Wireless Fidelity ("WiFi"), High Speed Packet Access ("HSPA"), (including High Speed Downlink Packet Access ("HSDPA") and High Speed Uplink Packet Access ("HSUPA")), Ultra Mobile Broadband ("UMB"), SUPL, SAS/CBRS, 5G New Radio (NR), and/or the like.

High throughput, low latency, wireless networks, for example next generation gigabit LTE and 5G NR networks, provide for dense base station deployments where a device 130 in a geographic location can access the network via multiple available base stations or cells. These base stations or cells can be operated by different network operators and thus the device 130 may not have access to all the associated networks, or the device 130 can have roaming access to those networks on a secondary basis based on a roaming partner priority.

Considering, for example, where the device 130, belongs to a network operator A having base stations 111 and 114, the device 130 can also receive compatible signals from base stations 110 and 113 operated by network operate B, and base stations 112, and 115 operated by network operator C if these base stations are also broadcasting the same wireless technology signals, for example, LTE or 5G NR synchronization signals. The power level received at the device 130 from each of operator's B and operator's C base stations can be stronger than the power level the device receives from network operator A's base stations 111 and 114. As discussed below, device 130 can consume a large amount of power when scanning for signals from each of these base stations operating in different frequency bands and channels. Therefore, device 130 can prioritize the frequency channels associated with the multiple base stations based on which frequency channel can most likely result in the best connection and set an order to scan the different frequency channels based on this prioritization thereby reducing the time and power required to arrive at the frequency channel that results in the best connection. This is prioritization and ordering is discussed further below.

Figure 2:
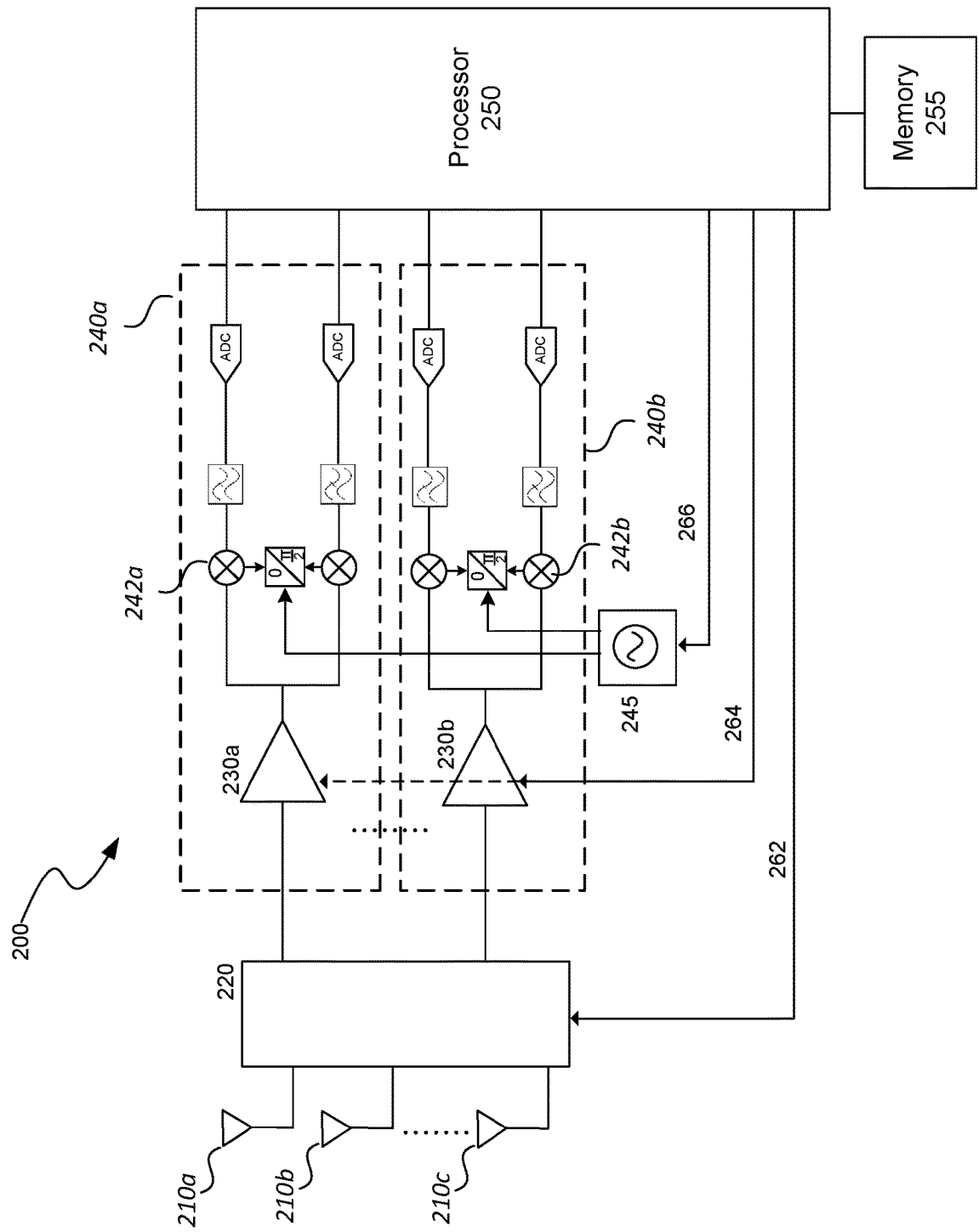
FIG. 2 is a block diagram of a representative device to perform frequency scans.

FIG. 2 is a block diagram of a representative wireless communication device 130 that can perform frequency scanning according to implementations discussed below. Device 130 typically includes one or more antennas 210a, 210b, and 210c for transmit/receive diversity, multiple-input/multiple-output (MIMO), and/or beamforming. It can also include a switching block or matrix 220, to switch one or more of the antennas 210a-c to corresponding duplexers, filters, and impedance matching networks (not shown), and to a corresponding receive chain such as receive chain 240a or 240b. Device 130 typically also includes a processor 250 for performing, for example, functions related to the wireless standard's protocol stack, including tuning the transceiver to perform frequency scanning. For example, to scan a frequency channel at 600 MHz, processor 250 can instruct switching block 220 to enable antenna 210a which can be tuned to 600 MHz (e.g., low band LTE Band 71); to scan a frequency channel at 3.5 GHz, processor 250 can instead instruct switching block 220 to enable antenna 210c which can be tuned to 3.5 GHz (e.g., high band LTE Band 48/CBRS band). When switching block 220 enables antenna 210a, processor 250 can also enable low noise amplifier (LNA) 230a in receive chain 240a which can be configured to amplify signals in the 600 MHz band, and further enable down-conversion mixer 242a, configured to down-convert the 600 MHz band signal to baseband, for example. On the other hand, when switching block 220 enables antenna 210c, processor 250 can also enable LNA 230b which can be optimized for the 3.5GHz band and enable down-conversion mixer 242b configured to down-convert the 3.5 GHz signal. The switching by switching block 220, and processing of the received signals in receiver chains 240a and 240b such as signal amplification, down-conversion, digitization, etc. consumes large amounts of power.

Device 130 also typically includes a memory 255 which can be a non-volatile memory for storing the instructions that processor 250 executes, as well as storing configuration settings of device 130. Memory 255 can be, for example, a hard drive, flash memory, memory card, and/or a Subscriber Identity Module (SIM), Universal SIM (USIM), or embedded SIM (eSIM), etc. Device 130 also includes a power supply such as a battery (not shown). As will be described further below, processor 250 is configured to control the order in which switching block 220, and receive chains 240a and 240b, tune to different frequency bands and channels to receive signals from the different frequency bands and channels. This frequency tuning order is such that device 130 arrives at the desired frequency channel fastest and with the lowest amount of power consumed from the power supply.

In some implementations, configurable multimode multiband circuit blocks such as configurable multimode multiband LNA are used in lieu of multiple LNAs and can be configured by processor 250 to receive signals from different frequency bands. Before the device 130 can communicate with one of the base stations 110-115 (in FIG. 1), it must scan for signals transmitted by the base stations, including synchronization signals. Each base station potentially operates at a different frequency channel. Because the device 130 can be unaware of the frequency channels the base stations are operating on, in one implementation, the device scans all possible frequency channels that the device can operate on. In some implementations, the processor 250 obtains from memory 255, the frequency channels that device 130 can operate on; for example, for 4G LTE or 5G NR, a list of bands supported by device 130. Additionally, or alternatively, processor 250 can obtain from memory 255 (e.g., a USIM module) a list of frequencies supported by the operator and/or a list of frequencies supported by roaming partners, including the preference of one roaming partner over another. Using these lists of frequencies, the processor 250 can configure the switching matrix 220 via a channel 262 to enable one or more of the antennas 210a, 201b, 210c tuned to the first frequency channel on the list. Processor 250 can configure, the LNAs 230a, 230b, via a channel 264, to enable the LNA corresponding to the selected frequency band. Processor 250 can also configure a frequency synthesizer 245, via a channel 266, to generate an appropriate local oscillator frequency needed to down-convert the received signal on the corresponding receive chain. As discussed in the background section above, for technologies such as LTE or 5G NR with wide frequency bands, this frequency scanning process is power intensive because at each scan frequency, the active components required to select, amplify, down-convert, digitize, demodulate, decode, and process the signals in the frequency channel all consume power.

Figure 3A:
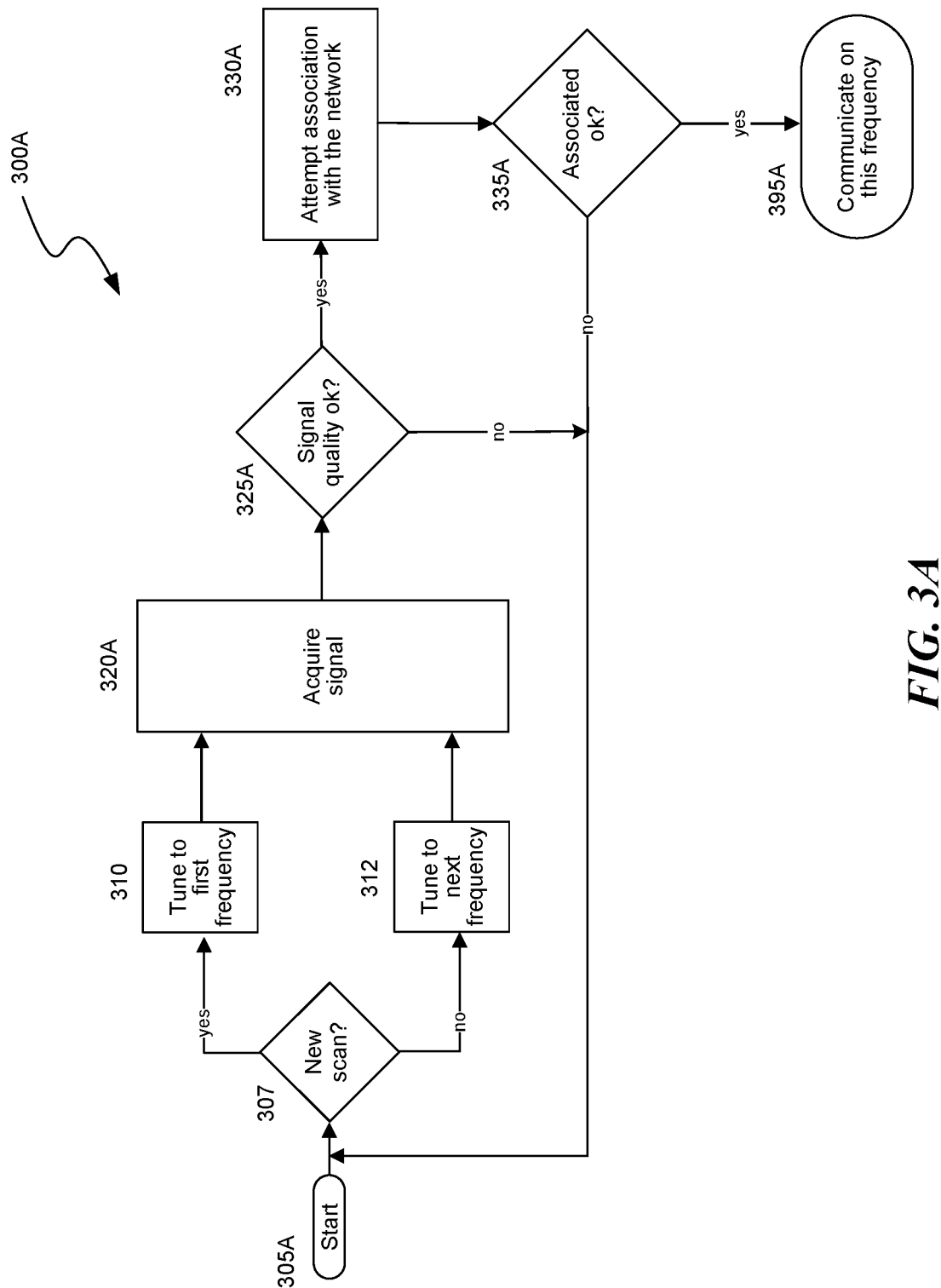
FIG. 3A is a representative flow diagram showing a procedure for scanning frequencies.

FIG. 3A is a prior art diagram 300A to help explain how the disclosed technology overcomes the problems disclosed above, and improves on the prior art procedure for scanning frequencies. This procedure can be stored as software or firmware in non-volatile memory, such as memory 255. At block 305A, device 130 starts an initial scan. This can be initiated by, for example, a power up of the device 130 or a wakeup from sleep or idle mode when the device had been disassociated or unsynchronized from the wireless communication network. For example, in LTE systems this can be a cell selection or a cell reselection procedure. At block 307, for new scans, the processor 250 tunes device 130 to a first frequency of the set of frequencies that the device can operate on (block 310). At block 320A, device 130 acquires any signals received on the first frequency. For example, for LTE systems this can be primary and secondary synchronization signals. At block 325A, the processor 250 determines if the signals received are acceptable, i.e., if they are of the correct type (e.g., for LTE, the primary synchronization signal must be a Zadoff-Chu signal), and determines if the received signal has sufficient power.

If the signal is not acceptable, the processor 250 initiates a new scan at block 307, and tunes the device 130 to the next available frequency channel at block 312. However, if at block 325A, processor 250 determines that the signal received is acceptable, the device 130 attempts to associate with or connect to the network at block 330A and, if it associates acceptably at block 335A, it communicates on the network, at block 395A, on that selected frequency. However, if device 130 fails to associate with the network, the process of scanning a next frequency repeats until device 130 is associates with the network.

In devices employing prior art frequency scanning procedures, the list of frequencies that device 130 iterates through, and the order in which it iterates through those frequencies, is predetermined and static (for example, is stored in memory 255). This leads to a large power consumption because of the higher probability that more iterations will be required before the device 130 finds an appropriate frequency. The larger number of iterations are because of the large search space for wideband channels, and the potentially large number of unaffiliated operators using the same technology in the same geographic area and broadcasting on frequencies that the multiband device 130 supports. That is, even when a signal is detected at block 325 from one of the base stations 110-115 (in FIG. 1), it may not be the signal required or desired for communication by the device 130, thereby increasing the number of required frequency scans.

For example, where the device 130 is an LTE device and the base stations 110-115 (in FIG. 1) broadcast LTE synchronization signals, the received signal power of the synchronization signals from base station (enB) 115, corresponding to network operator C, can be stronger than that from base stations 111 or 114 corresponding to the desired network operator A. After scanning through the listed frequencies in the prescribed order, device 130 can acquire the signal from base station 115, and, after decoding a system information block type 1 (SIB1), determine that a PLMN (Public Land Mobile Network) identity saved in memory 255 (e.g., in a USIM) does not match the one transmitted by base station 115. Device 130 can then move on to decode a SIB1 of the next strongest signal (for example, base station 113, followed by base station 111) until it finds a match with a signal from base station 111. However, even though base station 111 corresponds to the desired network operator A, device 130 can continue the cell selection procedure if the signal strength of the signal from base station 111 is not strong enough and a stronger signal, for example from base station 114, exists. As discussed further below, device 130 can implement an improved technique to scan the signals from the different base stations in its vicinity to reduce the number of frequency scans required.

Figure 3B:
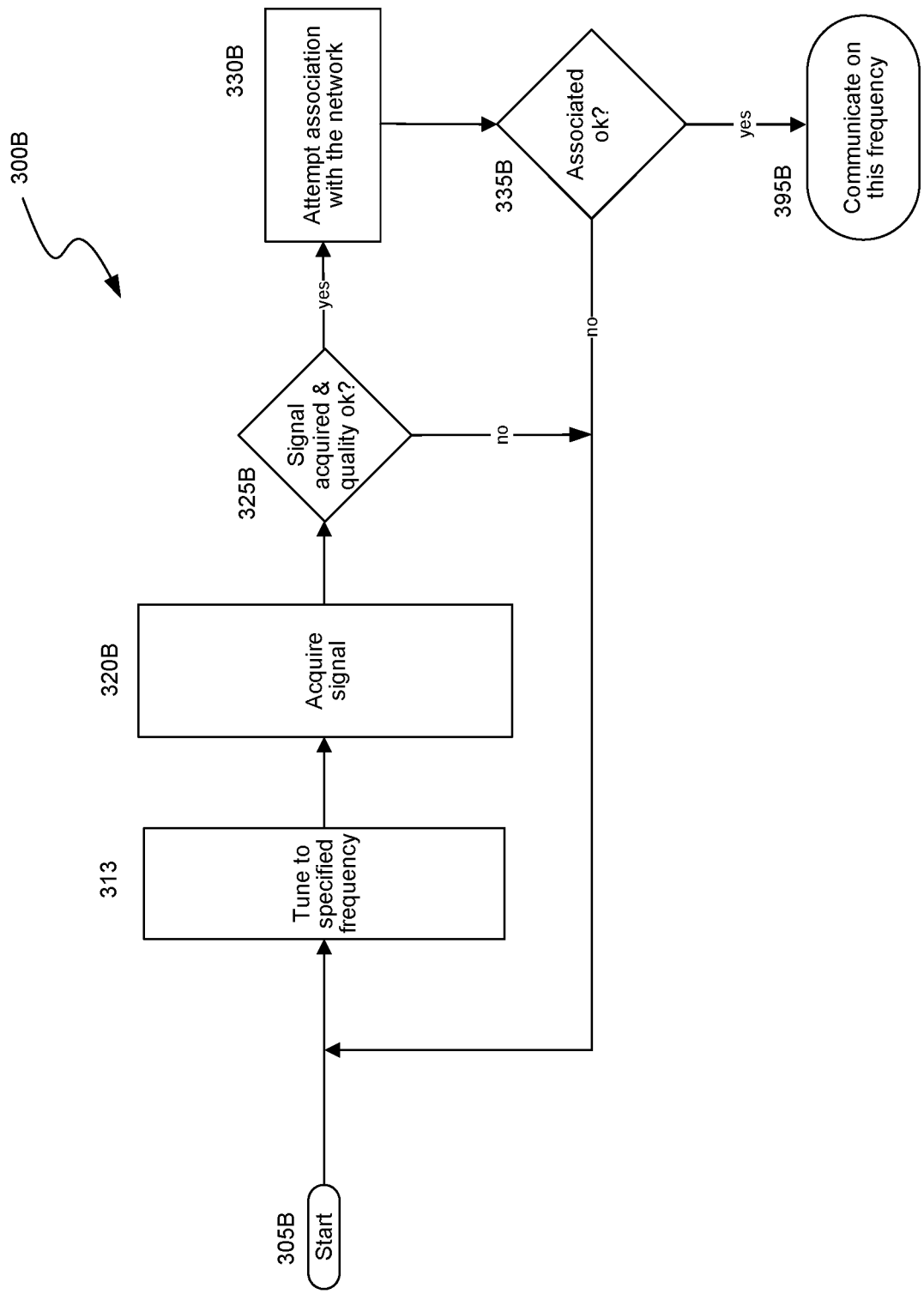
FIG. 3B is a representative flow diagram showing an improved procedure for scanning frequencies.

FIG. 3B is a representative flow diagram 300B showing an improved procedure for scanning frequencies. At block 313, device 130 tunes to a frequency channel with the highest probability of a successful connection. At block 320B, device 130 acquires signals transmitted in the tuned frequency channel. At block 325B, if the acquired signals are acceptable, device 130 attempts, at block 330B, to associate with the network. If the association is successful at block 335B, device 130 connects to the network at block 395B using the frequency tuned at block 313. However, if at block 325B the acquired signal is not acceptable (e.g., the signal quality is below a predetermined threshold or does not mean other signal criteria such as type of sequence), or at block 335B device 130 is not able to associate with the network using the parameters derived from the signal acquired at block 320B (e.g., signal is from an unaffiliated operator), device 130 tunes to a frequency channel with the second highest probability of a successful connection at block 313 and repeats the process described above.

As further explained in relation to FIG. 4 below, because at block 313 device 130 starts with the frequency channel that is predicted to have the highest likelihood of a successful connection, fewer or no subsequent iterations can be required thereby reducing the power consumption associated with frequency scans. Also, because the sequence of frequency channels to scan is ordered based on the relative likelihood that the signals acquired from each of the scanned frequency channels will be acceptable, even when the first scanned frequency does not yield acceptable signals, the iterations over other possible frequency channels quickly converges to a frequency channel that yields acceptable signals. Scanning through a device-data-metric-dependent ordered list of frequencies contrasts with prior art frequency scanning procedures described in relation to FIG. 3A where a blind search through a static list or predetermined list of frequency channels results in iterating over a larger number of frequency channels with a low probability of a successful connection for many of the frequency channels.

In some implementations, the frequency specified at block 313 is computed on a node outside device 130 and transmitted to device 130 when it successfully connects to the network. That is, device 130 can start by scanning all available frequencies, and after each successful connection can obtain a new frequency scanning order from the external node that it can use for its next connection attempt.

Figure 4:
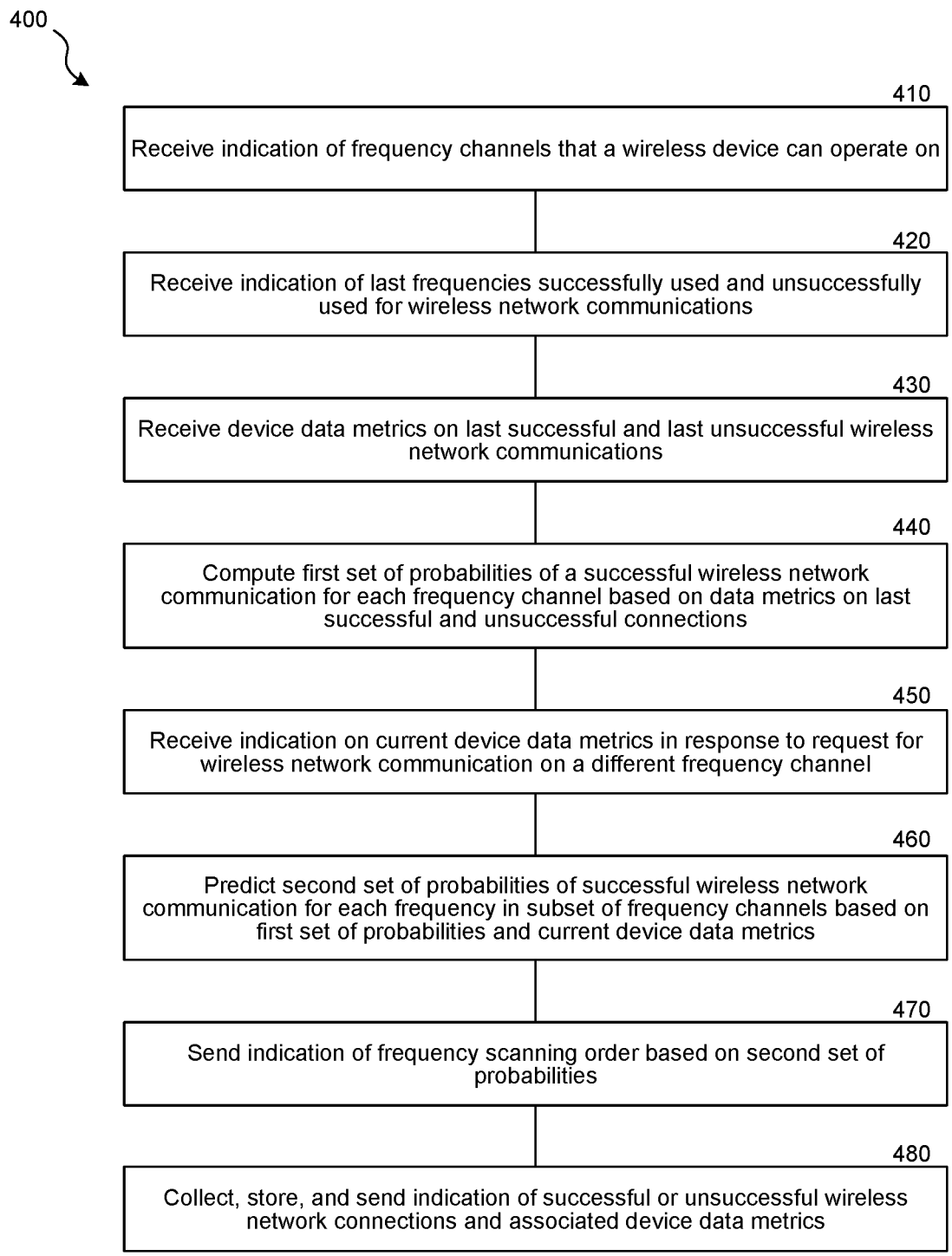
FIG. 4 is a representative flow diagram showing a procedure for predicting an order to scan a subset of frequency channels.

FIG. 4 is a representative flow diagram 400 showing a procedure for predicting or optimizing an order to scan a subset of frequency channels, where the order minimizes the power consumption of device 130, as well as minimizes the time required for device 130 to synchronize to, and start communication on, the network. At block 410 device 130 receives an indication of the set of frequency channels that it can operate on. This indication can be based on the frequency bands that the radio transceiver can operate on, as well as the frequency bands that the network operator (together with its roaming partners) can operate on. This information can be preprogrammed into device 130's non-volatile memory (e.g. memory 255) as a predetermined priority list, or can be stored in device 130's memory on a successful connection. This operator-specified frequencies and frequency priority list can be based on operator-specific criteria and preferences including, for example, revenue potential for different channels, for example for Priority Access Licensees (PAL) in CBRS/SAS systems that may be sublicensing their licensed spectrum.

At block 420, device 130 receives an indication of the last frequencies that it successfully communicated on, as well as the last frequencies in which connection attempts were not successful. This indication helps 130 determine which frequencies are likely to result in a successful connection attempt or communication (i.e., those that it already successfully communicated on), and those frequencies that are likely to result in a failed connection or failed communication (i.e., those frequencies in which connection attempts or communication was previously not successful).

Device 130 also receives, at block 430, an indication of device data metrics or device parameters corresponding to the last successful and last unsuccessful connection. In some implementations, these device data metrics can include the geographic location for the last connection attempt or last successful communication, a day or time, a quality of service requested for the last connection attempt, an actual quality of service achieved in the last communication, a network congestion level, a device capability, a network slice in which the device is operating, etc. The device data metrics include any parameters related to the performance, location, and state of the device or wireless environment in which the device can operate that can affect the device's ability to connect to the wireless network using a specific frequency channel. For example, device 130 can store a list of the last N frequency channels used, the GPS coordinates of the device when those frequencies were used, what day/time they were used, the quality of service that was requested (e.g., streaming video, voice, large file download), the quality of service that was achieved when using those frequency channels (e.g., packet error rate, call drop rate, throughput, latency, etc.), the power mode of the device 130 during the communication (e.g., if the device was operating at a reduced power mode because of low battery condition), and any other state of device 130 that can be available such as if device 130 was in a high speed train or in a poor coverage indoor environment.

At block 440, device 130 uses the device data metrics and the knowledge of the frequencies resulting in successful/unsuccessful connection attempts to predict what combinations of device data metrics favor one frequency channel over another. In one implementation, device 130 can compute or determine and assign each of the potentially useable frequency channels received in block 410 to a probability indicating how likely it is to yield a successful connection given selected device data metrics. In another implementation, the data metric itself can be the indicator of successful communication and the priority can thus be based on such data metric, for example, a signal-to-noise ratio or a packet error rate associated with a frequency channel. Various probabilities based on frequencies, device data metrics, connection attempts, etc. are possible. In some implementations, these probabilities are additionally based on operator-specified frequency priority lists.

For example, if at block 410 the device 130 received an indication that it can operate on frequencies f1, f2, f3, f4, f5, f6, f7, f8, f9, and f10, device 130 can, at block 440, compute (based on the device data metrics) that the probability of a successful connection using frequency f3 at location 1 is 99%, but the probability of a successful connection using the same frequency f3 at location 2 is 5%. Alternatively, it can compute that the probability of successfully using frequency f3 at location 1 between 7:00 PM and 6:00 AM is 96%, but the probability of successfully using frequency f4 at the same times and location is 97%. Additionally, it can determine that frequencies f9 and f10 are Unlicensed National Information Infrastructure (U-NII) channels reserved for Licensed Assisted Access (LAA) carrier aggregation, and have high probability of connection success when device 130 is at location 3 (owner's home/office), but that f10 has a higher probability of successful connection because it has had less congestion than f9 in the last several connection attempts. The device 130 can also determine that frequency f6 and f8 are operated by a roaming partner but, from a list stored in the memory 255 on device 130, determine that the roaming partner operating at frequency f8 is favored over the one operating at frequency f6 (for example because of closer network compatibility, offered services, or lower roaming rates).

In some implementations, device 130 can also use criteria pertaining to the signal quality of the signals in each of the frequency channels to define "successful connection" or connection quality. For example, the device 130 can determine that although f1 and f2 otherwise have the same connection-success probability given the device data metrics, previous connections using frequency f1 resulted in a higher quality of service or better connection quality (e.g., packet error rates, bit error rate, connection latency, retransmission rates, handoffs, etc. lower than a predetermined threshold; or signal to interference plus noise ratio, throughput, etc. being higher than a predetermined threshold). The device 130 can therefore prioritize frequency f1 higher than frequency f2. In some implementations, however, the decision on what probability to assign to different frequency channels is based on a requested service class. For example, if a real-time audio streaming connection is requested, a frequency channel that would result in a more reliable link with lower latency can be prioritized higher (and given a higher probability) than a frequency channel offering fast download speeds (for example, high bandwidth channels on upper frequency bands). The device capability (such as the UE category and services that the UE supports) can also be used to include frequency channels, exclude frequency channels, or prioritize frequency channels over others. For example, a data-only device can skip scanning low bandwidth frequency channels reserved by the operator for voice-services.

Alternatively, or additionally, the data metrics and prior knowledge on conditions for successful connection can be used as inputs to a machine learning algorithm either implemented on the device 130 or on the network (and sent to device 130 after a successful connection). The machine learning algorithm can take the complex data inputs and discover hidden insights from the historical relationships between the scanned frequencies and corresponding data metrics. These hidden insights can allow the machine learning algorithm to predict what would be the most efficient frequency scanning order given a set of device data metrics. In some implementations this prediction can be dynamically generated in real-time as more historical device data metric data is made available as an input to the machine learning algorithm. That is, the machine learning algorithm can change the scanning order midstream as it learns and predicts more optimal scanning orders.

For example, at block 450 when device 130 receives an indication on current device data metrics in response to a new scan request (e.g., when device powers on initially or roams to a new area and needs to camp on a new base station), the machine learning algorithm can predict at block 460 a probability for a successful connection on each of the available frequencies based on the current device data metrics, and at block 470 can send an indication of a frequency scanning order based on the predictions. The current device data metrics include a set of device data metrics corresponding substantially to a time the request for a communication by the wireless communication device was made and enables the algorithm to correlate the condition or settings in device 130 corresponding to when a frequency scan was successful or unsuccessful. Thus, if device 130 was at location 1 and initiated a new scan at, say 8:00 PM, the machine learning algorithm can instruct device 130 to start scanning frequency f4 first (which has a 97% probability of a successful connection), followed by frequency f3 (which has a 96% probability). The machine learning algorithm can omit frequency f7 from the scan list if it determines that the probability of a successful connection is below a certain threshold. That is, out of the ten available frequency channels as given in the example above, the machine learning algorithm can determine that only four can be scanned, and the order in which these four frequencies are scanned can be based on prior history as well as current device metrics. This eliminate six power-hungry frequency scan iterations, as well as the scenario discussed above where a signal is detected but is not of sufficient quality to sustain a reliable connection, resulting in it being discarded and another scan initiated. In some implementations, the frequency scanning order corresponds to the set of probabilities where frequencies with higher probability values are ranked higher in the set of probabilities.

In some implementations, the algorithm in blocks 460 and 470 can omit some low probability frequencies if, for example, the device 130's battery state (e.g., battery charge level is low or below a predetermined power level, battery temperature is high, battery capacity is low, etc.) and to conserve power it is deemed better to scan fewer frequencies, even if such a scan can miss a stronger signal on an omitted frequency. Additionally, in some implementations, the output of the machine learning algorithm can based on the device category or 5G NR network slice for the device's use case. For example, a low power, bandwidth reduced, low complexity, coverage enhanced (BL/CE) IoT (Internet of Things) device can prioritize low frequency bands that offer better coverage and reliability at lower throughput above high frequency bands. Conversely, an autonomous vehicle 5G NR network slice can prioritize frequency channels offering lower latency and higher reliability, and order scans based on such prioritization. In other implementations, the device data metrics can be further ranked and prioritized to assign different weights to the probabilities computed at block 440, for example, to break a tie in computed probabilities. This ranking can be, for example, related to device 130's category or requested service. For example, if two frequencies result in an equal probability for a successful connection, and device 130 is an IoT device, the lower of the two frequencies can be weighted to indicate a higher probability because lower frequencies typically lead to better coverage given the resulting lower path loss at lower frequencies.

At block 480, device 130 collects and stores data on successful and unsuccessful connection attempts, and the device data metrics associated with those connections, including data metrics relating to the quality of any successful connections. This stored data is then made available to device 130 at blocks 420 and 430.This feedback is used to enhance the predictions of the machine learning algorithm where the predictions become more accurate as more historical data is made available as an input to the algorithm.

In some implementations, the algorithms described above in relation to blocks 410-460 are not implemented in device 130 but are instead implemented on a device separate from device 130 such as a server on a network node. In these implementations, at block 480, device 130 can send device data metrics and status of connection attempts (successful/unsuccessful) to the external device whenever device 130 successfully connects to the network. The algorithms in the external device can then determine an optimal frequency scanning order for device 130 to use in subsequent frequency scans, and can send this frequency scanning order to device 130 at block 470.

Remarks

The Figures and above description provide a brief, general description of a suitable environment in which the invention can be implemented. Although not required, aspects of the invention can be implemented in the general context of computer-executable instructions, such as routines executed by a general-purpose data processing device, e.g., a server computer, wireless device or personal computer. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular or mobile phones (including Voice over IP (VoIP) phones), dumb terminals, media players, gaming devices, multi-processor systems, microprocessor-based or programmable consumer electronics, set-top boxes, network PCs, mini-computers, mainframe computers, and the like. Indeed, the terms "computer," "server," and the like are generally used interchangeably herein, and refer to any of the above devices and systems, as well as any data processor.

Aspects of the invention can be embodied in a special purpose computer or data processor that is specifically programmed, configured, or constructed to perform one or more of the computer-executable instructions explained in detail herein. While aspects of the invention, such as certain functions, are described as being performed exclusively on a single device or single computer, the invention can also be practiced in distributed environments where functions or modules are shared among disparate processing devices, which are linked through a communications network, such as a Local Area Network (LAN), Wide Area Network (WAN), or the Internet. In a distributed computing environment, program modules can be in both local and remote memory storage devices. Aspects of the invention can be stored or distributed on tangible computer-readable media, including magnetically or optically readable computer discs, hard-wired or preprogrammed chips (e.g., EEPROM semiconductor chips), nanotechnology memory, biological memory, or other data storage media.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations can perform routines having steps/blocks, or employ systems having blocks, in a different order, and some processes or blocks can be deleted, moved, added, subdivided, combined, and/or modified to provide alternative or subcombinations. Each of these processes or blocks can be implemented in a variety of different ways. Also, while processes or blocks are at times shown as being performed in series, these processes or blocks can instead be performed or implemented in parallel, or can be performed at different times. Further any specific numbers noted herein are only examples: alternative implementations can employ differing values or ranges.

The teachings of the invention provided herein can be applied to other systems, not necessarily the system described above. The elements and acts of the various examples described above can be combined to provide further implementations of the invention. Some alternative implementations of the invention can include not only additional elements to those implementations noted above, but also can include fewer elements.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. When statements or subject matter in an incorporated by reference conflict with statements or subject matter of this application, then this application shall control.

These and other changes can be made to the invention in light of the above Detailed Description. While the above description describes certain examples of the invention, and describes the best mode contemplated, no matter how detailed the above appears in text, the invention can be practiced in many ways. Details of the system can vary considerably in its specific implementation, while still being encompassed by the invention disclosed herein. As noted above, terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, certain aspects of the disclosed system be embodied as a means-plus-function claim, or in other forms, such as being embodied in a computer-readable medium. (Any claims intended to be treated under 35 U.S.C. § 112(f) will begin with the words "means for", but use of the term "for" in any other context is not intended to invoke treatment under 35 U.S.C. § 112(f).) Accordingly, the applicant reserves the right to pursue additional claims after filing this application to pursue such additional claim forms, in either this application or in a continuing application.

We claim:

1. A wireless communication device for scanning frequencies in a wireless communication network, the wireless communication device comprising:
   one or more antennas;
   a radio transceiver;
   one or more switches coupling the antennas to the radio transceiver;
   a memory;
   a processor;
   a battery to supply power to the antennas, to the radio transceiver, to the switches, to the memory, and to the processor;
   wherein the processor is coupled to the radio transceiver and to the memory, and wherein the processor is further configured to:
      identify an order of priority in which to scan a set of frequency channels, wherein the order of priority is based on a network slice in which the wireless communication device is operating;
      identify low frequency channels with a higher order of priority than high frequency channels when the network slice in which the wireless communication device is operating comprises an Internet of Things (IOT) network slice, or
      identify frequency channels offering lower latency with a higher order of priority than frequency channels offering higher latency when the network slice in which the wireless communication device is operating comprises an autonomous vehicle network slice;
      tune the radio transceiver to a first frequency channel in the set of frequency channels by configuring the switches to couple one of more antennas to one of more receive paths of the radio transceiver, wherein the first frequency channel has a highest priority in the order of priorities;
      receive, through the one or more receiver paths of the radio transceiver, a signal transmitted on the first frequency channel;
      determine if a signal quality of the received signal is above a predetermined threshold; and
      associate with a wireless communication network using parameters derived from the received signal if the signal quality is above the predetermined threshold, or tune the radio transceiver to a second frequency channel in the set of frequency channels if the signal quality is not above the predetermined threshold,
         wherein the second frequency channel has a second highest priority in the order of priorities.

2. The system of claim 1, wherein determining if the signal quality is above a predetermined threshold includes determining that the received signal matches a predetermined signal type, and that a signal power, a signal to interference plus noise ratio, or a bit error rate is above the predetermined threshold.

3. The system of claim 1, wherein the set of frequency channels is a subset of all frequency channels that the wireless communication device is capable of operating on that are selected to reduce the power consumed by the battery when the wireless communication device is scanning frequencies.

4. The system of claim 1, wherein the wireless communication device is further configured to reduce a number of frequency channels to scan in response to determining that a power level of the battery is below a predetermined power level.

5. The system of claim 4, wherein reducing the number of frequency channels to scan is based on prioritizing a likelihood of connection success using a specified frequency channel above a likelihood of a connection quality being above a predetermined quality.

6. The system of claim 1, wherein the processor is further configured to identify low frequency channels with a higher order of priority than high frequency channels when the network slice in which the wireless communication device is operating comprises an Internet of Things (IoT) network slice.

7. The system of claim 1, wherein the processor is further configured to identify frequency channels offering lower latency with a higher order of priority than frequency channels offering higher latency when the network slice in which the wireless communication device is operating comprises an autonomous vehicle network slice.

8. A processor-implemented method in a wireless communication device to determine an order for scanning frequency channels, the method comprising:
receiving an indication of a first set of frequencies, within a set of frequency channels, successfully used for previous communications by the wireless communication device;
receiving an indication of a second set of frequencies, within the set of frequency channels, unsuccessfully used for previous communications by the wireless communication device;
computing a first set of probabilities of a successful communication for each frequency in the set of frequency channels based on the first set of frequencies,
the second set of frequencies, and at least one of a device capability or a network slice in which the wireless communication device is operating; and
sending an indication of a frequency scanning order based on the first set of probabilities,
wherein the frequency scanning order comprises a first frequency channel having a higher probability of a successful communication than a second frequency channel, and
wherein:
the first frequency channel comprises a lower frequency than the second frequency channel when the network slice in which the wireless communication device is operating comprises an Internet of Things (IoT) network slice, or
the first frequency channel comprises a lower latency than the second frequency channel when the network slice in which the wireless communication device is operating comprises an autonomous vehicle network slice.

9. The processor-implemented method of claim 8, wherein the second set of frequencies, within the set of frequency channels, unsuccessfully used for previous communications includes at least one of a set of frequencies without compatible synchronization signals or a set of frequencies that result in a connection quality below a predetermined connection quality threshold.

10. The processor-implemented method of claim 8, wherein the first frequency channel comprises a lower frequency than the second frequency channel when the network slice in which the wireless communication device is operating comprises an Internet of Things (IoT) network slice.

11. The processor-implemented method of claim 8, wherein the first frequency channel comprises a lower latency than the second frequency channel when the network slice in which the wireless communication device is operating comprises an autonomous vehicle network slice.

12. A non-transitory computer-readable medium storing instructions that, when executed by a processor in a wireless communication device, cause the wireless communication device to scan frequency channels, the method comprising:
initiating a scan of a set of frequency channels;
identifying an order in which to scan the set of frequency channels,
wherein the order in which to scan the set of frequency channels is dynamically generated based on a network slice in which the wireless communication device is operating;
tuning a radio transceiver of the wireless communication device to a first frequency channel in the set of frequency channels, wherein the first frequency channel has a highest priority in the order of priorities;
attempting to acquire a signal transmitted on the first frequency channel;
determining if a signal quality of the signal is above a predetermined threshold in response to successfully acquiring the signal;
attempting to associate with a wireless communication network using parameters derived from the acquired signal;
communicating on the wireless communication network on the first frequency channel in response to successfully associating with the wireless communication network;
tuning the radio transceiver to a second frequency channel in the set of frequency channels, the second frequency channel having the second highest priority in the order of priorities; and
attempting to acquire a signal transmitted on the second frequency channel, wherein:
the first frequency channel comprises a lower frequency than the second frequency channel when the network slice in which the wireless communication device is operating comprises an Internet of Things (IOT) network slice, or
the first frequency channel comprises a lower latency than the second frequency channel when the network shoe in which the wireless communication device is orseratino comprises an autonomous vehicle network slice.

13. The computer-readable medium of claim 12, wherein the order in which to scan the set of frequency channels is dynamically generated by a machine learning algorithm with inputs including a list of frequencies used in multiple prior successful connection attempts, a location of the wireless communication device corresponding to each one of the prior successful connection attempts, and a day and time corresponding to each one of the prior successful connection attempts.

14. The computer-readable medium of claim 12, wherein the wireless communication network includes at least one of an LTE network, a 5G New Radio network, an IEEE 802.11 compatible network, or a Spectrum Access System (SAS) Citizens Broadband Radio Service (CBRS) compatible network.

15. The computer-readable medium of claim 12, wherein identifying an order in which to scan the set of frequency channels further comprises determining a probability for a successful connection attempt for each frequency channel in the set of frequency channels, and ordering the frequency channels based on the probabilities starting from the frequency channel with the highest probability of a successful connection attempt.

16. The computer-readable medium of claim 12, wherein identifying an order in which to scan the set of frequency channels further comprises receiving, from a node in the wireless communication network, the order of priority in which to scan the set of frequency channels, and storing the order of priorities in a memory in the wireless communication device.

17. The computer-readable medium of claim 12, wherein the first frequency channel comprises a lower frequency than the second frequency channel when the network slice in which the wireless communication device is operating comprises an Internet of Things (IoT) network slice.

18. The computer-readable medium of claim 12, wherein the first frequency channel comprises a lower latency than the second frequency channel when the network slice in which the wireless communication device is operating comprises an autonomous vehicle network slice.

* * * * *